United States Patent [19]
Whitten

[11] 3,758,069
[45] Sept. 11, 1973

[54] RIBBON TYPE FLOW CONTROL DEVICE

[75] Inventor: David E. Whitten, Northridge, Calif.

[73] Assignee: Air-Dry Corporation of America, Northridge, Calif.

[22] Filed: Dec. 29, 1971

[21] Appl. No.: 213,669

[52] U.S. Cl. .............................. 251/58, 137/505.46
[51] Int. Cl. ...................... F16k 17/04, F16k 31/12
[58] Field of Search................... 137/505.46; 251/58

[56] References Cited
UNITED STATES PATENTS

| | | | |
|---|---|---|---|
| 1,921,632 | 8/1933 | Mott et al. | 137/505.46 |
| 2,036,601 | 4/1936 | Mott | 137/505.46 |
| 1,859,914 | 5/1932 | Buttner | 137/505.46 |
| 2,874,924 | 2/1959 | Good | 251/58 |
| 825,559 | 7/1906 | Schrader | 137/505.46 |
| 1,874,680 | 8/1932 | Wolfe | 137/505.46 |

Primary Examiner—Arnold Rosenthal
Attorney—Robert C. Comstock

[57] ABSTRACT

A ribbon type flow control device which provides a variable mechanical advantage. A ball type poppet is removably mounted in a valve seat. A pair of elongated flat resilient ribbons are connected at one end thereof to the ball and fixed at the other end. A diaphragm reacts to pressure changes to move a push rod transversely against the midportion of the ribbons and deflect them into an arcuate configuration. Deflection of the ribbons moves the ball away from the valve seat. The push rod has a mechanical advantage with respect to movement of the ball. This mechanical advantage decreases with increased deflection of the ribbons. When the ball is in closed position engaging the valve seat, the ribbons buckle to provide an added mechanical advantage between movement of the push rod and movement of the ball.

10 Claims, 10 Drawing Figures

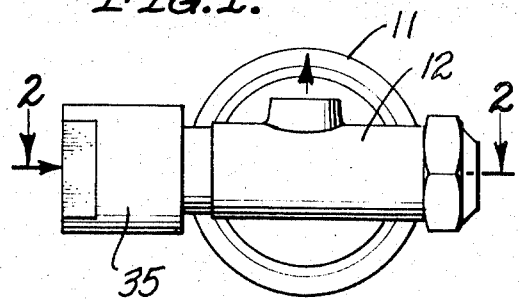
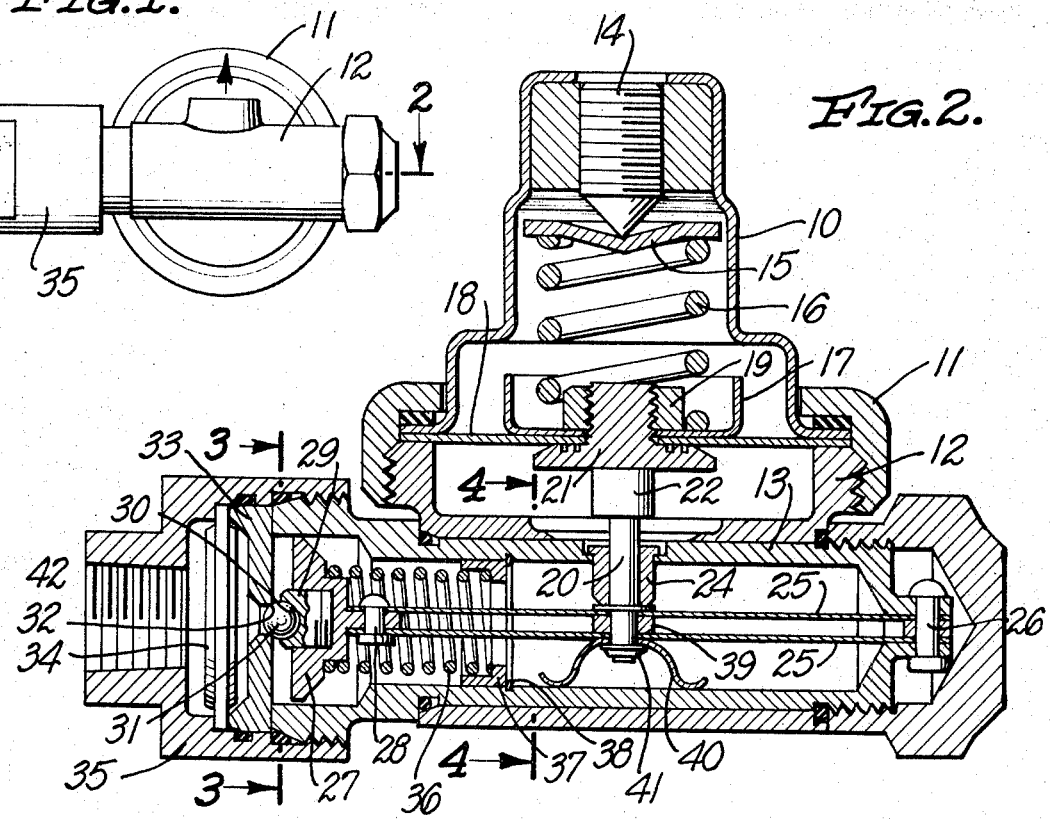
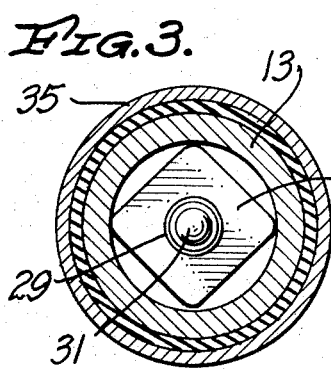
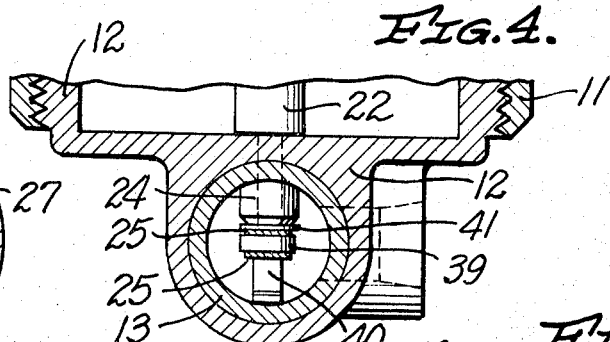
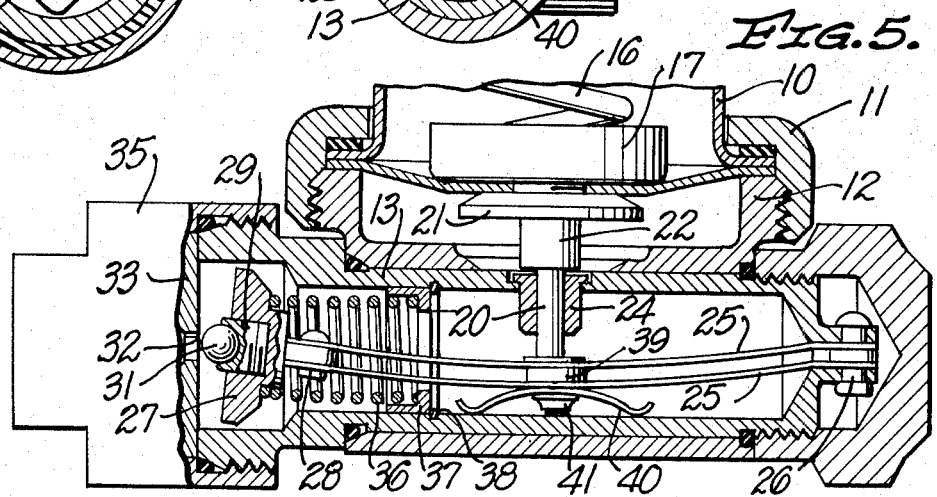

RIBBON TYPE FLOW CONTROL DEVICE

BACKGROUND OF THE INVENTION

1. Field of the Invention:

The invention relates to a flow control device which can be used in liquid or pneumatic systems and in fluid controls such as regulators, relief valves, solenoid valves, on-off devices and other devices which require or which can utilize a control mechanism which provides a variable mechanical advantage.

2. Description of the Prior Art:

A flow control device which utilizes hard poppet-seat interfaces, particularly metal-to-metal, requires a large force to seat the poppet. From the reseal or touch position to sealoff requires a seat stress proportionate to the degree of flatness and the asperities of the materials used. In the case of regulators and relief valves, the controlled pressure inaccuracy is proportional to the amount of sealing force. In the case of a simple direct acting regulator this seat stress reflects itself in a regulated pressure error inversely proportional to the controller pressure sensing area. For a metal-to-metal poppet-seat design this pressure error can be significant.

Another problem is that destructive chatter can occur with small poppet strokes and large pressure differential, due to Bernoulli effects. Poppet chatter is caused by fluid flow pressure variations on the poppet and seat, usually at small strokes due to effective poppet pressure area changes. Seat-poppet chatter and instability occur at high inlet pressures and low flow rates.

On the other hand, soft poppets and seats require less sealing force. They have other disadvantages, however, such as temPerature limitations (both hot and cold), fluid and contamination erosion which adversely affect their reliability and life, dimensional instability due to cold flow and limited fluid compatability.

A control device of the type now in use in relief valves in order to achieve results comparable to the present invention would require extremely large sensing elements which would have the disadvantages of excessive size and weight. A comparable solenoid valve would likewise require an extremely large coil. A simple lever type of structure has the disadvantage of requiring large control strokes. Large control strokes require a low rate (vibration sensitive) controller spring and corresponding increase in package size (clearances).

A high mechanical advantage is required when using a metal-to-metal seat and/or large pressure sensing diaphragms, but if the same mechanical advantage were continued through the flow control stroke to full flow or maximum opening, it would require an excessively long control stroke and would result in an unacceptably large amount of regulated pressure error.

SUMMARY OF THE INVENTION

The ideal solution for an all metal control device with minimum control pressure error is a control device which has a very high mechanical advantage at lockup, a lesser but still high mechanical advantage for small poppet strokes to minimize chatter and instability and a low mechanical advantage for medium to high flow regulation. It should also have a small controller stroke, to reduce the controller spring rate error and hysteresis.

An object of the present invention is to provide a control device which either achieves or closely approaches such ideal solution.

With the present invention, a large mechanical advantage is provided because the ribbon (or ribbons) will buckle at lockup to form an "S" shape. Just prior to buckling there is a 10/1 mechanical advantage between the controller transverse ribbon load and the poppet-seat longitudinal load. After buckling, this mechanical advantage increases to approximately 30/1 due to the center support effecting two shorter beams since the buckling load is inversely proportionate to the square of the length.

After opening, with small poppet strokes, a large ribbon deflection is required to effect a small poppet stroke. This large mechanical advantage is desirable for accurate flow control and eliminates seat chatter especially with high inlet pressures. The mechanical advantage rapidly diminishes with ribbon deflection.

One of the primary objects of the present invention is to provide a flow control device which affords a substantial amount of mechanical advantage which gives increased poppet-seat sealing force and easier control with small poppet strokes.

A further object of the invention is to provide such a device in which this mechanical advantage decreases rapidly as the poppet leaves the seat.

A more particular object of the invention is to provide a structure through which a mechanical advantage such as approximately 30 to 1 can be attained. Obtaining a mechanical advantage of this order by means of a simple lever is either impractical or the mechanism would become excessively large due to the minimum dimensions required between the fulcrum and poppet and the correspondingly increased dimensions of the lever.

Another object of the invention is to provide a device of the type described in which there are no friction or wear points on the ribbon because the ends are fixed.

A further object of the invention is to provide a device of the type described in which the desired mechanical advantage is accomplished by bending the ribbon to increase its arc and decrease its chord, thus opening the poppet.

It is amOng the objects of the invention to provide a flow control device which possesses the advantages and benefits set forth above and described hereinafter in this specification.

Another object of the invention is to provide a flow control device having a variable mechanical advantage.

My invention also comprises such other objects, advantages and capabilities as will later more fully appear and which are inherently possessed by my invention.

While I have shown in the accompanying drawings, a preferred embodiment of my invention, it should be understood that the same is susceptible of modification and change without departing from the spirit of the invention.

DESCRIPTION OF THE DRAWINGS

FIG. 1 is a bottom plan view of a flow control device constructed in accordance with my invention;

FIG. 2 is a longitudinal sectional view of the same taken along line 2—2 of FIG. 1, with the device in closed position;

FIG. 3 is a transverse sectional view taken along line 3—3 of FIG. 2;

FIG. 4 is a transverse sectional view taken along line 4—4 of FIG. 2;

FIG. 5 is a partial sectional view similar to FIG. 2, but showing the device in open position;

DESCRIPTION OF THE PREFERRED EMBODIMENT

Figure 6:
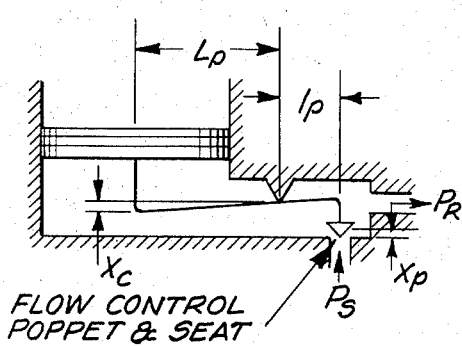
FIG. 6 is a diagrammatic drawing of a conventional method of obtaining a mechanical advantage by a simple lever between a controller (pressure sensing element) and a flow control poppet.

A preferred embodiment which has been selected to illustrate my invention comprises a bonnet 10, which is secured by a bonnet ring 11 to a body 12 which encloses an elongated hollow tube 13. The bonnet 10 contains an adjusting screw 14 which is vertically movable to adjust the position of a spring button 15 disposed beneath the adjusting screw 14. An elongated adjusting spring 16 extends between the button 15 and an inverted cup 17.

The cup 17 is mounted on the upper side of a resilient diaphragm 18, which extends transversely and is held at its periphery between the lower flange of the bonnet 10 and the body 12.

A hexagonal nut 19 which is disposed within the cup 17 is attached to the upper end of a metallic button, the lower portion of which is disposed beneath the diaphragm 18 and the upper portion of which extends through the center of the diaphragm 18.

The upper end of a push-rod 20 is disposed in abutting relationship with the bottom of the button 21. The push-rod 20 has a portion of reduced diameter which slidably extends through a guide sleeve 24, the upper end of which is brazed to the tube 13. The top of the guide sleeve 24 acts as a stop to limit the downward movement of the push-rod 20 by engaging diametrically enlarged portion 22.

Extending longitudinally within the tube 13 for the major portion of its length are a pair of parallel elongated flat resilient ribbons 25, which may be formed of beryllium copper strip, spring steel or other suitable material. The ribbons 25 are secured at one end thereof to each other and to the tube 13 by a rivet 26. The ribbons 25 are secured at their opposite ends to each other and to the diametrically reduced inner end of a piston 27 by a rivet 28.

The opposite end of the piston 27 carries a centrally disposed ball guide 29. The ball guide 29 has a ball socket 30 in which a ball 31 is rotatably mounted. The portion of the ball 31 remote from the ball socket 30 engages a circular metallic valve seat 32 which is formed in a seat member 33 which extends transversely across one end of the tube 13. The seat member 33 has a flat face which is directed toward the ball guide 29 and the valve seat 32 comprises the end of a circular passage 42 formed in the center thereof. The valve seat 32 extends through the seat member 33 and is slightly enlarged on the side of the seat member 33 remote from the ball 31.

A transversly directed filter disc 34 is disposed outwardly from the seat member 33. The filter disc 34 and the seat member 33 are held in place by an inlet fitting 35 which is threadedly attached to the end of the tube 13. The inlet fitting 35 is provided with an internally threaded opening which is connected to the valve seat 32 through the filter disc 34.

A poppet spring 36 surrounds the inner end of the piston 27, the rivet 28 and the adjustment ends of the ribbons 25. One end of the poppet spring 36 engages the piston 27 while the other end engages a spring retainer 37 which is held within the tube 13 by a back-up ring 38.

A metallic spacer 39 is disposed between the ribbons 25 adjacent the midportion thereof directly beneath the push-rod 20. A semicircular leaf spring 40 is attached at its center to the ribbons 25 by a retainer 41 which extends through the spring 40 and ribbons 25 and is outwardly enlarged at its opposite ends. The leaf spring 40 has a pair of free ends which bear against the inner surface of the tube beneath and on opposite sides of the spacer 39.

FIG. 2 of the drawings shows the device in closed position, with the ball 31 comprising the poppet and being firmly seated in the valve seat 32. A decrease in the pressure within the tube 13 causes the diaphragm 18 to be deflected downwardly, moving the button 21 and push-rod 20 downwardly. Downward movement of the push-rod 20 exerts downward pressure against the midportions of the ribbons 25, causing them to be deflected and bent downwardly against the pressure of the leaf spring 40.

As the ribbons 25 bend, they pull the piston 27 inwardly and slightly downwardly, thereby pulling the ball 31 away from the valve seat 32 to allow fluid to flow through the inlet fitting 35 into the tube 13 and out through a transversely directed fluid outlet 43 which connects with the interior of the tube 13.

As the pressure within the tube 13 is increased, the diaphragm 18 flexes upwardly, pulling the button 21 and push-rod upwardly and relieving the downward pressure on the midportions of the ribbons 25. The ribbons 25 will return to a substantially straight position, moving the ball guide 29 upwardly and outwardly to return the ball 30 to closed position sealing off the valve seat 32 and cutting off the flow through inlet fitting 35.

It is preferable that the device be so designed that at lockup or complete sealoff, the ribbons 25 will buckle in two places to form an "S" shape. This is indicated schematically in FIG. 9 of the drawings. It has not been shown in FIG. 2 because the amount of buckling is slight and difficult to show in proper proportion.

The mechanical advantage provided by the ribbons 25 prior to buckling is approximately 10/1. After buckling, the mechanical advantage is increased to approximately 30/1, due to the fact that the ribbons 25 are in effect converted into two short sections of one half the original length. Since the buckling load is inversely proportional to the square of the length, the mechanical advantage would in theory be increased four times. In practice, the result is approximately a three times increase.

It has been found that if the ball 31 and valve seat 32 are perfectly matched and if all parts are smooth and dimensionally perfect, it is possible to achieve a complete sealoff or lockup without buckling the ribbons 25. The buckling provides added force, however, which assures a complete sealoff under less than perfect conditions.

FIG. 6 of the drawings is a diagrammatic or schematic view showing a conventional method of obtaining a mechanical advantage by a simple lever between the control actuated by a pressure sensing element and a flow control poppet. In FIG. 6, the symbols represent the following: $Xc$ - controller stroke, $Xp$ - poppet stroke, $Lp$ - length of controller lever, $lp$ - length of poppet lever, $Lp/lp$ - mechanical advantage, $Pr$ - outlet pressure, $Ps$ - inlet pressure.

It will be noted that obtaining a large mechanical advantage calls for $Lp$ to be as large as possible and/or for $lp$ to be as small as possible. Making $Lp$ larger presents problem of excessive size and weight. Making $lp$ smaller presents problems of minimum achievable dimensions.

Figure 7:
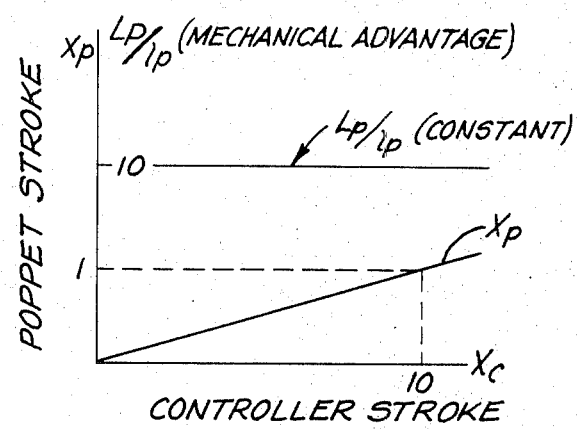
FIG. 7 is a graph showing the linear relationship of controller stroke versus poppet stroke and constant mechanical advantage of a structure of the type shown in FIG. 6.

FIG. 7 is a graph showing the linear relationship between the controller stroke and the poppet stroke in a conventional structure of the type shown in FIG. 6. It will be noted that in this structure the mechanical advantage is a constant.

Figure 8:
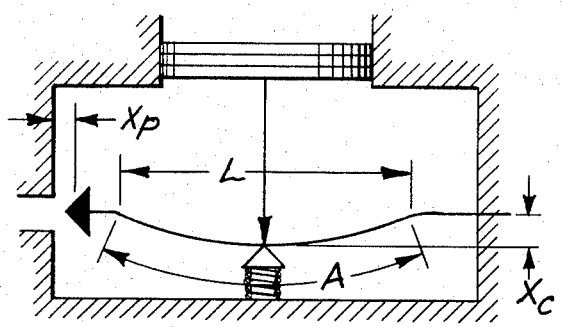
FIG. 8 is a diagrammatic drawing of the present invention in open position, with the ribbon bowed.

FIG. 8 is a diagrammatic or schematic diagrgm which illustrates the present invention, with the controller depressed to bow the ribbon and open the poppet. In this diagrgm, $Xp = (A - L) = f(Xc)$. The poppet opening is equal to the length of the arc of the ribbons 25, less the length of their chord. The poppet opening ($Xp$) is accordingly a function of the controller stroke ($Xc$).

Figure 9:
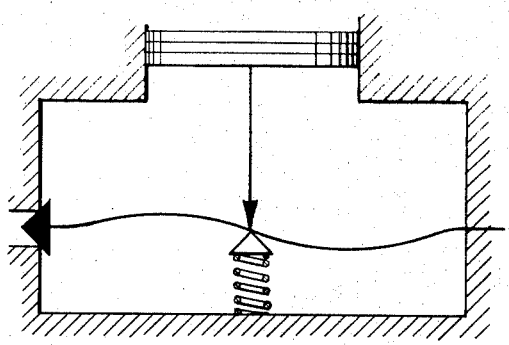
FIG. 9 is a similar view with the poppet closed (lock up) and the ribbon buckled in an "S" shape to provide sealoff force.

FIG. 9 is a diagrammatic view similar to FIG. 8 showing the poppet in closed or lock up position, with the ribbon buckled into an "S" shape to provide seal-off force. The buckling of the ribbon has been omitted from FIG. 2 of the drawings for clarity of illustration.

Figure 10:
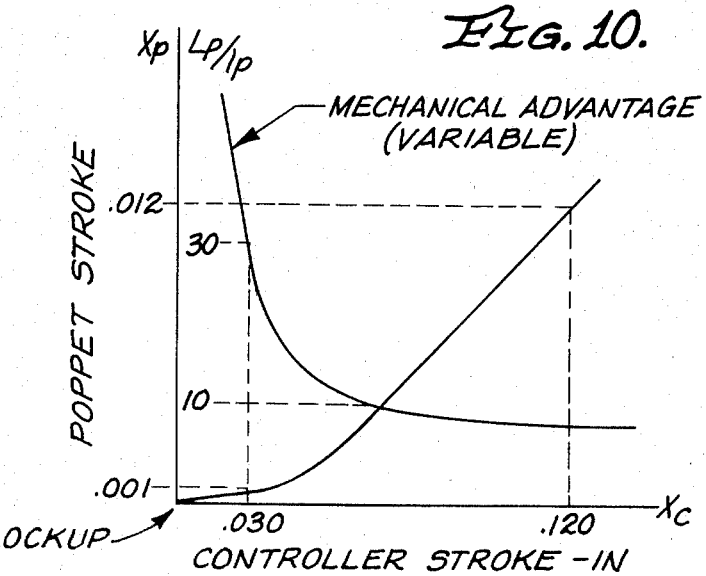
FIG. 10 is a graph showing the non-linear relationship of controller stroke versus poppet stroke and the resultant non-linear mechanical advantage provided by the present invention.

FIG. 10 is a graph showing in one line the relationship between the controller and the valve opening. The other line shows the change in mechanical advantage as the valve is progressively opened. It will be noted that at first opening there is an extremely high mechanical advantage and a relatively large controller stroke will produce a relatively small poppet stroke. After the valve is opened further, the mechanical advantage progressively decreases, so that a relatively smaller controller stroke is then required to produce further opening of the poppet.

I claim:

1. A flow control device for a valve having a seat and a poppet removably mounted in said valve seat for opening and closing said valve, said flow control device comprising at least one elongated resilient ribbon, one end of said ribbon being connected to said poppet and the other end of said ribbon being fixed, said ribbon normally being substantially straight and in longitudinal alignment with respect to said valve seat, control means extending transversely with respect to said ribbon, said control means being movable to engage said ribbon adjacent the midportion thereof and deflect said ribbon into an arcuate configuration, the deflection of said ribbon moving said poppet away from said valve seat to open said valve, said ribbon being adapted to return to a substantially straight configuration to reseat said poppet upon the reverse movement of said control means, said control means having a substantially large mechanical advantage with respect to the movement of said poppet, said mechanical advantage decreasing with the increased deflection of said ribbon by said control means, said ribbon being constructed and arranged to buckle at two places between its midportion and its opposite ends when said valve is closed, providing an increased mechanical advantage between said control means and poppet.

2. The structure described in claim 1, said device including a pair of parallel spaced ribbons.

3. The structure described in claim 1, and a piston carrying a ball, said piston connected to one end of said ribbon, a coil spring normally urging said piston and ball toward said valve seat.

4. The structure described in claim 1, said piston being mounted for outward tilting movement away from said valve seat upon the arcuate deflection of said ribbon.

5. The structure described in claim 4, and second spring means disposed on the opposite side of said ribbon from said control means, said second spring means urging said ribbon oppositely to said control means.

6. The structure described in claim 5, said second spring means comprising an elongated leaf spring having it's midportion in engagement with said ribbon opposite from said control means.

7. The structure described in claim 6, and diaphragm means connected to said control means, said diaphragm means being adapted to move said control means in response to changes in pressure on the opposite sides of said diaphragm.

8. The structure described in claim 3, said device including a pair of parallel spaced ribbons.

9. The structure described in claim 8, and a spacer disposed between the midportions of said ribbons.

10. The structure described in claim 6, said device including a pair of parallel spaced ribbons, said leaf spring engaging the ribbon remote from said control means.

* * * * *